Figure 1:
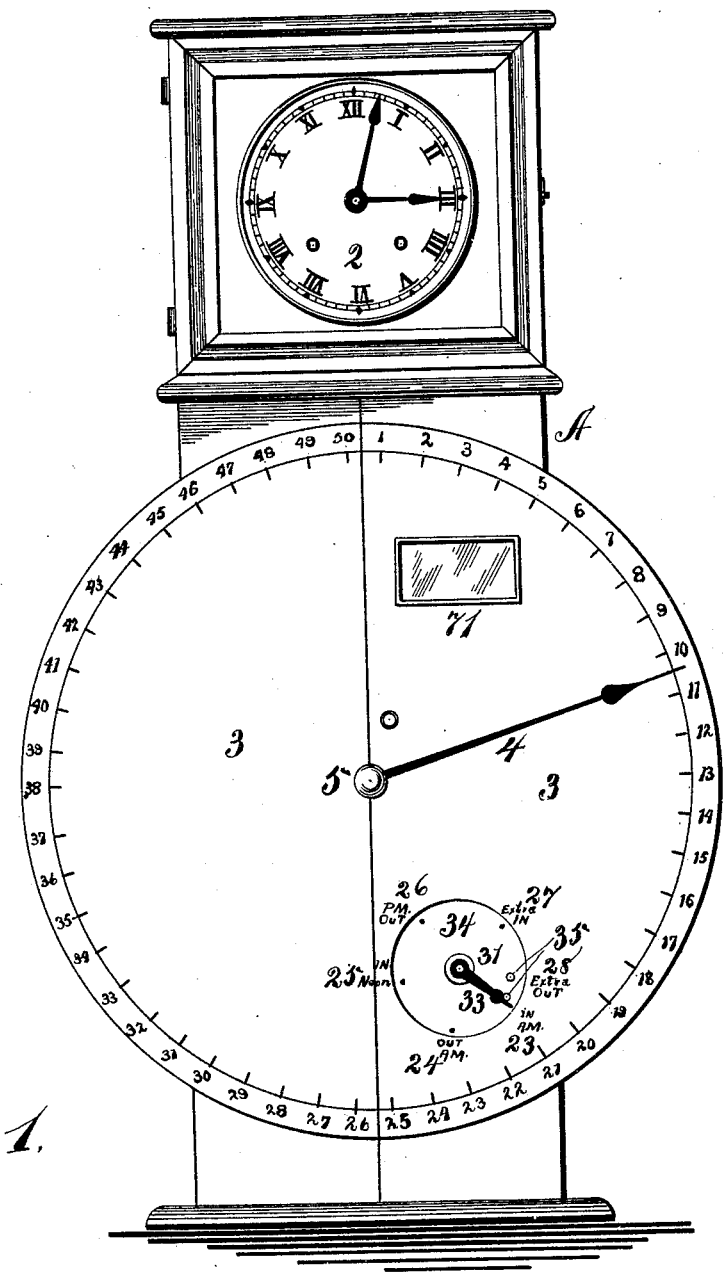

(No Model.) 6 Sheets—Sheet 1.

W. L. BUNDY.
WORKMAN'S TIME RECORDER.

No. 546,222. Patented Sept. 10, 1895.

WITNESSES:
H. A. Carhart,
C. W. Marvin.

INVENTOR
Willard L. Bundy.
BY
Smith & Arnison
ATTORNEYS.

(No Model.) 6 Sheets—Sheet 2.

W. L. BUNDY.
WORKMAN'S TIME RECORDER.

No. 546,222. Patented Sept. 10, 1895.

WITNESSES:
H. A. Carhart,
C. W. Marvin.

INVENTOR
Willard L. Bundy.
BY
Smith & Denison
ATTORNEYS (No Model.) 6 Sheets—Sheet 3.
W. L. BUNDY.
WORKMAN'S TIME RECORDER.
No. 546,222. Patented Sept. 10, 1895.

INVENTOR
Willard L. Bundy.
BY
Smith & Amison
ATTORNEYS.

WITNESSES:
H. A. Carhart,
C. W. Marvin.

(No Model.) 6 Sheets—Sheet 4.

W. L. BUNDY.
WORKMAN'S TIME RECORDER.

No. 546,222. Patented Sept. 10, 1895.

WITNESSES:
H. A. Cashart,
C. W. Marvin.

INVENTOR
Willard L. Bundy
BY
Smith & Denison
ATTORNEYS (No Model.) 6 Sheets—Sheet 5.

W. L. BUNDY.
WORKMAN'S TIME RECORDER.

No. 546,222. Patented Sept. 10, 1895.

WITNESSES:
H. A. Carhart,
C. W. Marvin.

INVENTOR
Willard L. Bundy.
BY
Smith & Ainson
ATTORNEYS.

(No Model.) 6 Sheets—Sheet 6.
W. L. BUNDY.
WORKMAN'S TIME RECORDER.
No. 546,222. Patented Sept. 10, 1895.
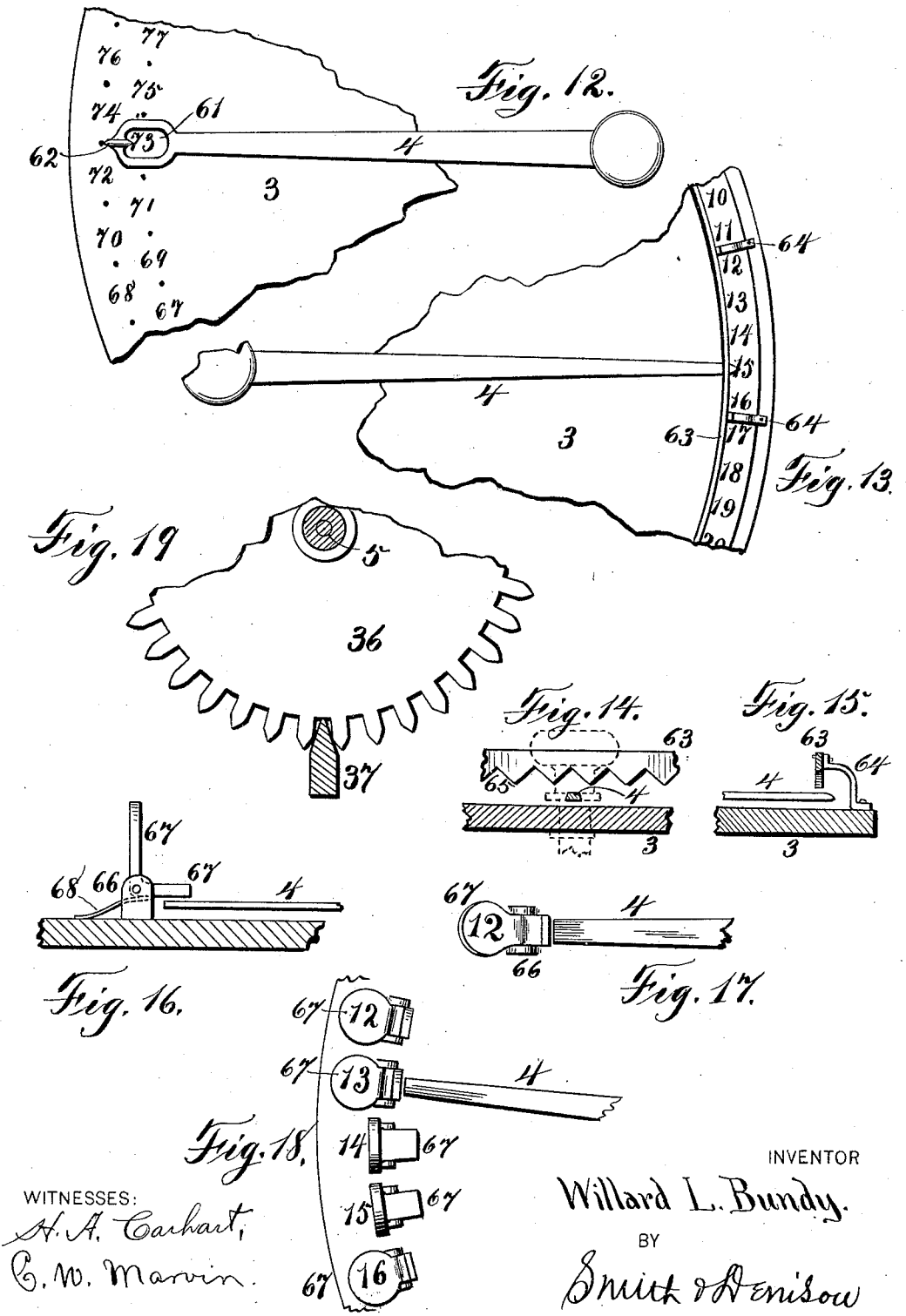
WITNESSES:
H. A. Carhart,
C. W. Marvin.
INVENTOR
Willard L. Bundy.
BY
Smith & Denison
ATTORNEYS.

UNITED STATES PATENT OFFICE.

WILLARD L. BUNDY, OF BINGHAMTON, NEW YORK, ASSIGNOR TO THE BUNDY MANUFACTURING COMPANY, OF SAME PLACE.

WORKMAN'S TIME-RECORDER.

SPECIFICATION forming part of Letters Patent No. 546,222, dated September 10, 1895.

Application filed February 28, 1895. Serial No. 539,960. (No model.)

*To all whom it may concern:*

Be it known that I, WILLARD L. BUNDY, of Binghamton, in the county of Broome, in the State of New York, have invented new and useful Improvements in Workmen's Time-Recorders, of which the following, taken in connection with the accompanying drawings, is a full, clear, and exact description.

My invention relates to workmen's time-recorders, and particularly to that class in which the records are made upon a dial and in radial lines thereon, means being provided by which the printing mechanism is shifted to print at different points upon any radial line, as may be desired, to record the entrance or departure of a workman, either in the morning, afternoon, or evening, or all of them, thus making the whole record of a regular day's work and of extra time all upon a single line.

My object is to produce a workman's time-recorder in which the printing mechanism is movable or adapted to be shifted laterally in order to record upon a paper disk the time of entrance and departure in the forenoon and afternoon, or either, and also any extra time of a workman; in which by turning a knob a pointer is shifted to the number indicating the workman who desires to make a record, and then by pulling out the pointer the impression-platen is actuated to strike an impression blow and the hour and minute is printed onto a paper disk from time-wheels which are synchronous with a clock-movement, said dial being provided with a row of marginal numbers the same as those upon the dial and being so mounted upon a support carried by the pointer-shaft as to be rotated by and with said shaft, so that when the pointer indicates a given number the line of printing-spaces upon the disk indicated by the same marginal number will be upon the printing-line of the impression mechanism; in which means are provided whereby, if it is stopped at a point adjacent to the desired number, it will be shifted precisely to the number when the pointer-shaft is drawn out, thereby insuring alignment of the printing and that each imprint is made in the proper place; and in which means are provided, in case the minute-wheel is normally between two numerals thereon, so that when the pointer-shaft is pulled out said wheel is shifted, so that only one minute-numeral is printed upon the dial, and by means of a flexible connection between the time-wheel mechanism and the clock-movement such shifting forward or back of the minute-wheel and its momentary stoppages will not affect the running-time of the clock; and the wheel when released by the return of the pointer-shaft to its normal position will, by the torsion of said connection, be thereby rotated, so as to again indicate the exact time of the clock, as between two minutes.

My invention consists in the several novel features of construction and operation hereinafter described, and which are specifically set forth in the claims hereunto annexed. It is constructed as follows, reference being had to the accompanying drawings, in which—

Figure 2:
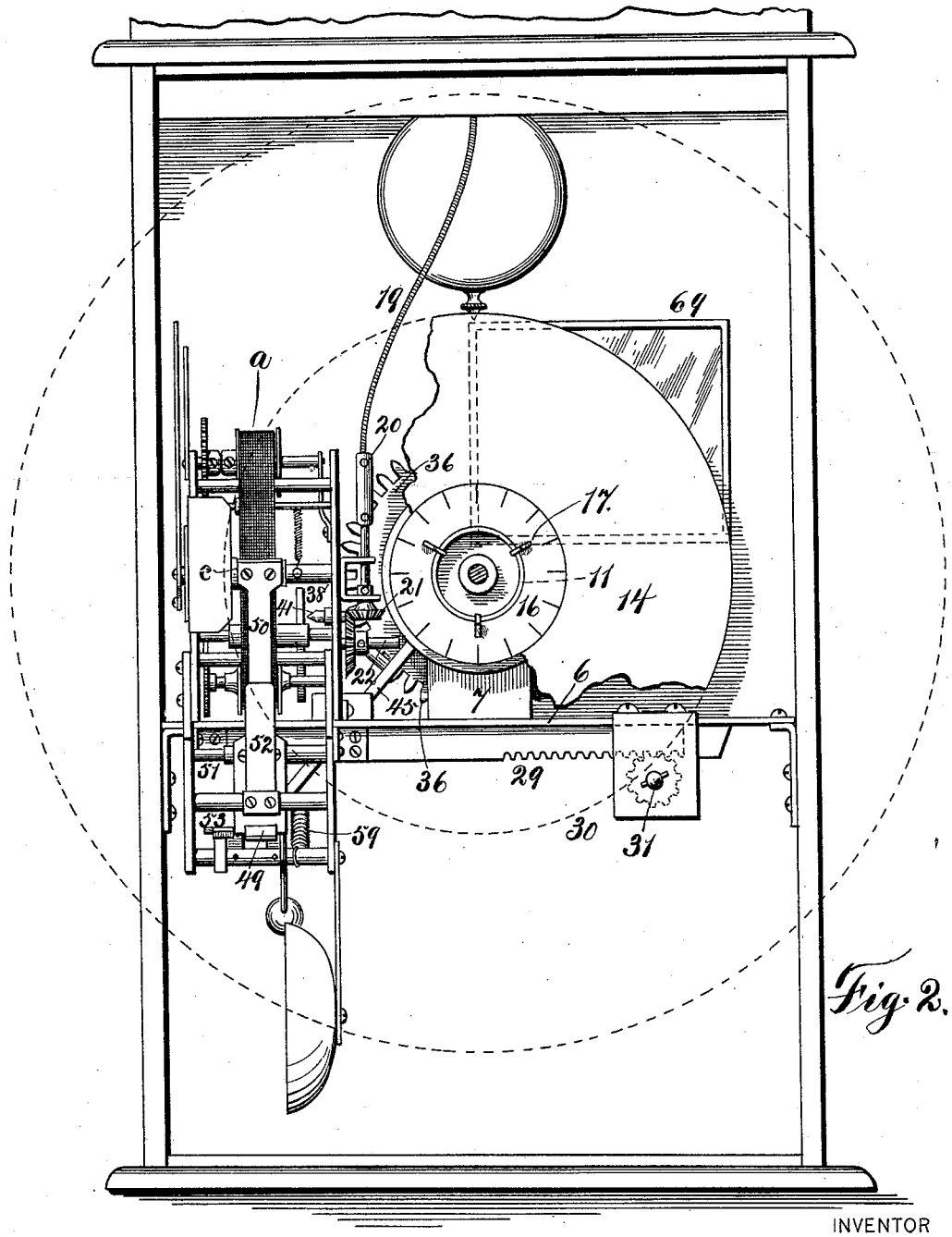
Figures 3, 4:
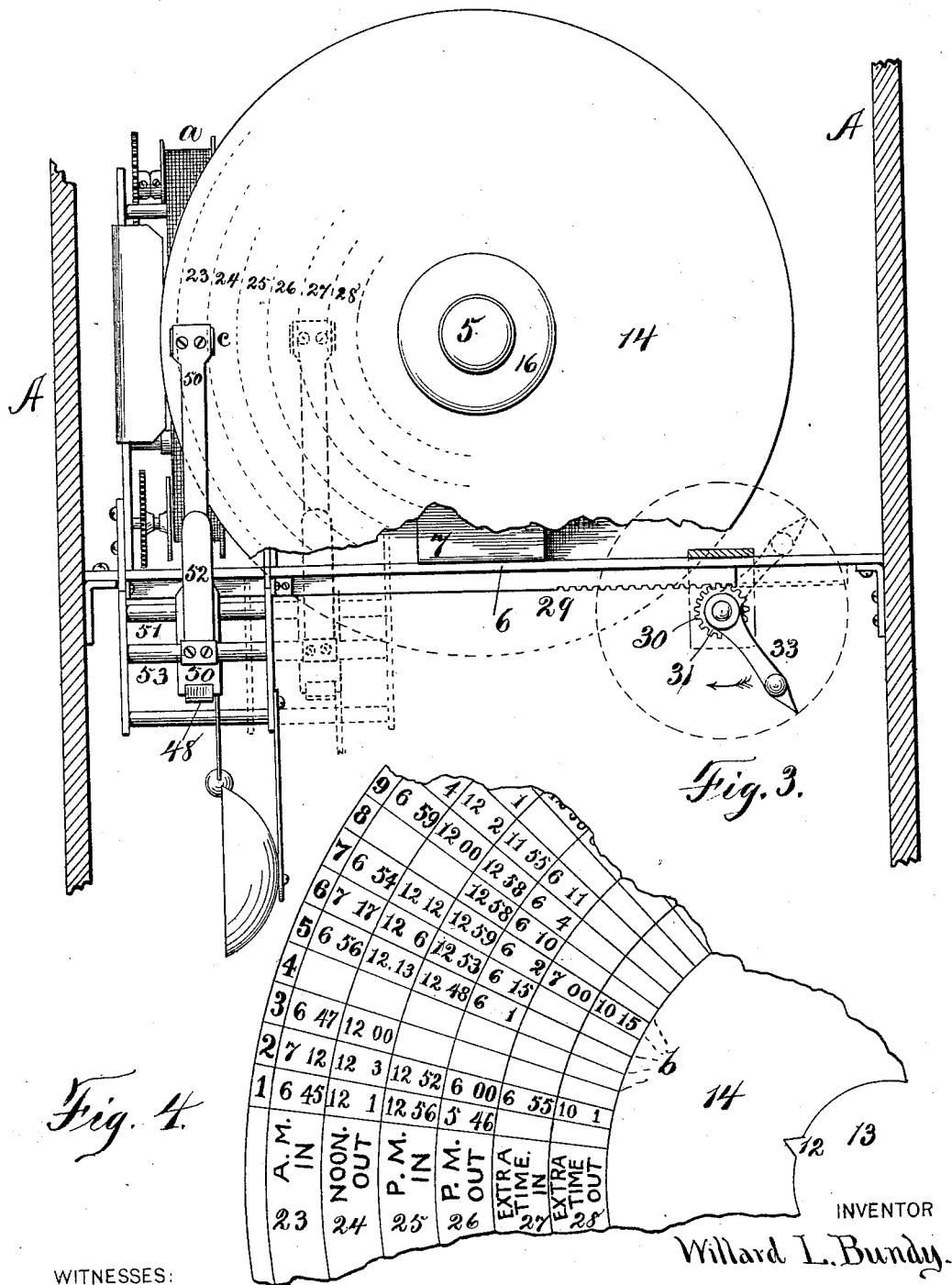
Figures 5, 6:
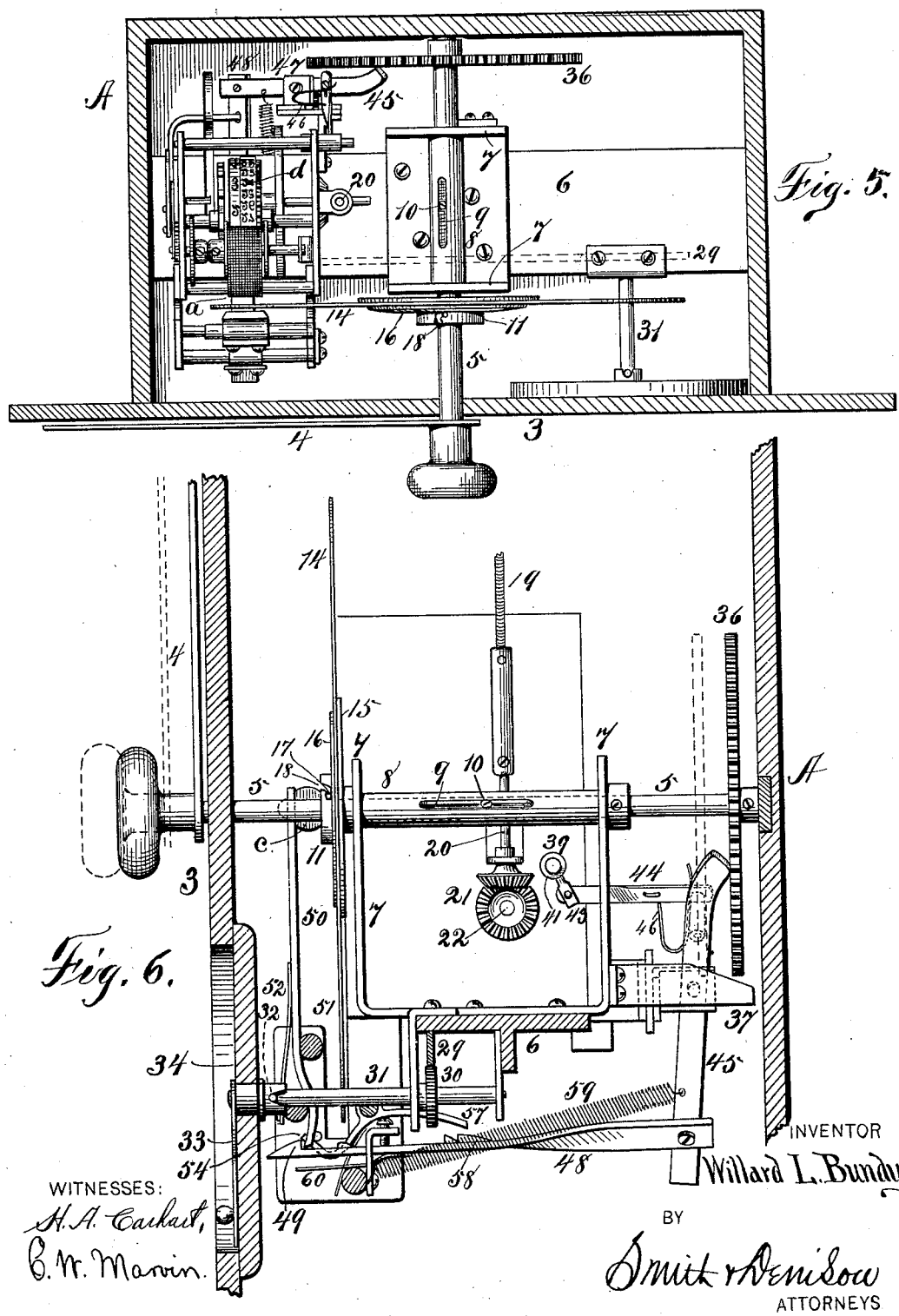
Figure 7:
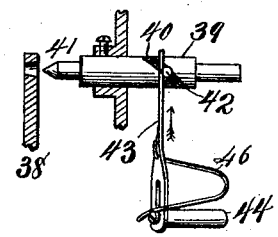
Figure 8:
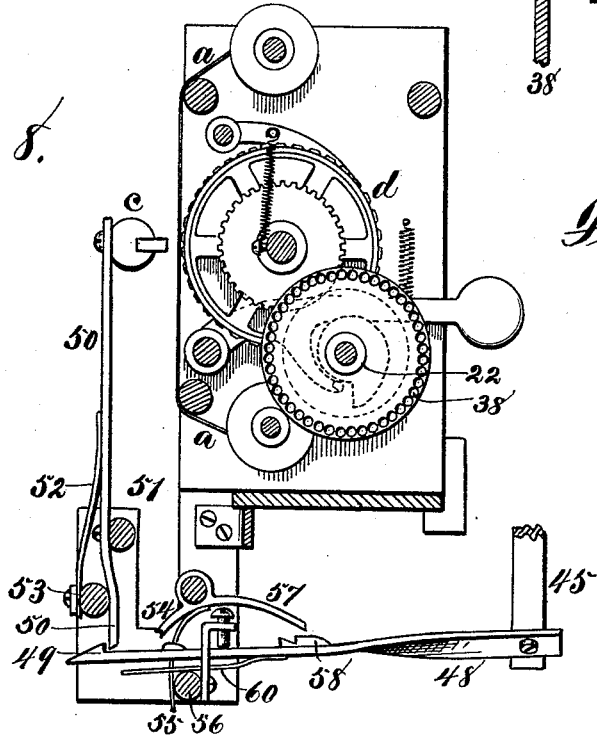
Figure 9:
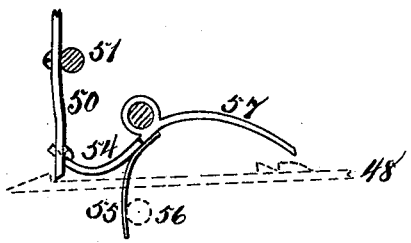
Figure 10:
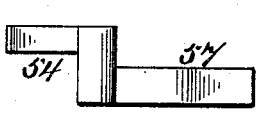
Figure 11:
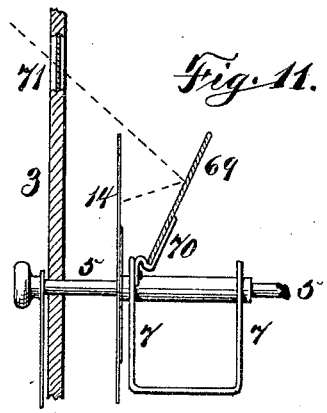

Figure 1 is a front elevation of the machine. Fig. 2 is a like view of the same enlarged and omitting the clock and dial, the latter being indicated by the dotted line, part of the recording-disk being broken away. Fig. 3 is an enlarged detail of the printing mechanism, record-disk and mechanism for shifting the printing mechanism, the dotted lines upon the disk indicating its subdivision into spaces and the printing mechanism shifted. Fig. 4 is a plan of a part of the disk, illustrating the records made thereon. Fig. 5 is a top plan of the apparatus, except the clock, the case being in section. Fig. 6 is a sectional side elevation of the pointer-setting, pointer-guiding, shifting, platen-operating and tripping mechanisms, and also the mechanism for controlling the minute-wheel. Fig. 7 is a sectional detail of part of the regulating-wheel and the mechanism for controlling it. Fig. 8 is a sectional detail illustrating the time-wheels, the minute-wheel regulator, the impression-platen, and its actuating and tripping mechanism. Fig. 9 is a sectional detail of the platen-tripping mechanism. Fig. 10 is a detail of the tripping-pawl. Fig. 11 is a sectional detail of a reflecting-mirror mechanism for viewing the obverse face of the disk upon which the records are made. Fig. 12 is a detail of part of the dial, showing the workmen's numerals in two rows and the pointer adapted thereto. Fig. 13 is a detail of the dial, pointer, and a pointer-guide affixed to and projecting beyond the face of the disk. Fig. 14 is a sectional detail of the same, showing the guideways in said guide. Fig. 15 is a sectional detail illustrating one way of mounting said guide upon the dial. Fig. 16 is a sectional detail of a tilting numeral-block mounted upon the dial and part of the pointer. Fig. 17 shows the numeral-block tilted by the operation of the pointer. Fig. 18 is a detail of part of a dial, part of a pointer, and several numeral-blocks, part of which are tilted to show that the workmen which they indicate have recorded their entrance or departure, as the case may be, by the fact that they are tilted. Fig. 19 is a sectional detail of the numeral-finder wheel upon the pointer-shaft and the guiding-wedge which throws the pointer to the numeral and also locks the pointer-shaft against rotation and holds the disk, so that the printing is made in proper alignment with the marginal numeral thereon.

A is a suitable case in which any ordinary clock 2 is set up, and 3 is a workman's numeral-dial, (shown as containing the consecutive numerals from 1 to 50, and also as vertically divided, so that it also constitutes the doors through which access is had to the interior of the case,) and 4 is a pointer mounted upon a shaft 5 concentric to said dial. Across said case a shelf 6 is secured, upon which standards 7 are erected, and in these the shaft 5 is journaled, and 8 is a sleeve upon said shaft and between said standards and provided with a slot 9 and a pin 10 through it into said shaft, whereby the latter is guided in its reciprocatory movement, as hereinafter described, and within said sleeve is a suitable coiled spring (not shown) adapted to be compressed by the outward movement of said shaft and when it is released to return it to its normal position. Upon said shaft a circular boss 11 is secured, provided with a rib suitable to fit into a notch 12, Fig. 4, in the opening 13 in the center of the record-disk 14, which fits over said boss and against a suitable plate or backing secured on said shaft behind or integral with said boss, and 16 is a clamping-plate fitting over said boss, and suitably engaging with it to hold the record-disk in position, the pins 17 on said clamp entering suitable angular notches 18, Fig. 6, being shown as one convenient means for locking said clamp onto the record-disk. Upon said shelf the time mechanism is mounted, so as to be traversed thereon, and comprising time-wheels, hour and minute, synchronous with the clock-movement by means of a flexible shaft 19, actuating a shaft 20, the bevel-gear 21, and shaft 22 and other connections actuated thereby, whereby said wheels indicate the same time as the clock at the printing-line, which is shown as being in the same plane as that of the shaft 5, all of such time-wheel mechanism being the same as that shown in the several patents heretofore granted to me. An ink-ribbon $a$ is mounted upon suitable spools and is fed by any suitable mechanism passing in front of the time-wheels and between them and the record-disk. The numerals upon the dial indicate the workmen, each of whom has a numeral given to him and by which he is known and distinguished, and the numerals around the record-disk are the same. The record-disk is set with reference to the dial, so that when the pointer indicates "2" on the dial the radial line marked "2" on the record-disk will be on the printing-line; and in like manner when the shaft 5 is turned in either direction by hand to whatever numeral the pointer is turned the same numeral upon the record-disk will be upon the printing-line. For convenience the record-disk is divided into radial record-spaces by the radial lines $b$, and these are subdivided transversely by concentric circles, substantially as shown, the outer row of spaces 23 being those in which the records of entrance into the factory in the morning are made; the next row 24 those in which the forenoon departures are recorded; the next row 25 those in which the afternoon entrances are made; the next row 26 those in which the afternoon departures are recorded; the next row 27 those in which evening entrances are recorded, or where employés work in the evening, or where they work extra time or overtime; and the inner row 28 the evening departures are recorded.

By reference to Fig. 4 it will be seen that workmen Nos. 1, 2, 5, 6, 7, and 9 were present all day; that workman No. 3 was only present in the morning; that workman No. 8 was present only in the afternoon, and that workmen Nos. 2 and 7 were respectively present in the evening from the entrance-time recorded to that of departure. This record-making in these radial spaces is effected by shifting the printing mechanism, as by the following or any other equivalent mechanism. A rack-bar 29 is secured at one end to the frame which carries said printing mechanism, with which the pinion 30 engages, mounted upon a shaft 31 suitably journaled and fitting into a suitable socket 32 journaled in the front of the case, and 33 is a combined crank-handle and pointer mounted upon said socket-piece, and 34 is a setting-dial spaced off, substantially as shown, and as shown in Fig. 1 the pointer shows that the recording mechanism is set to record morning entrances; and by turning the pointer and rotating the pinion-shaft and pinion the printing mechanism is shifted to each of the radial recording-spaces, the dotted lines in Fig. 3 indicating that it has been shifted to the record-space indicated by "extra in" upon the setting-dial and record-disk, the dots 35 indicating stops to prevent further turning of the pointer.

For clearness of understanding the setting-marks upon the setting-dial are numbered the same as the spaces which they respectively indicate upon the record-disk. Upon the rear of the shaft 5 a gear 36, Figs. 5, 6, and 19, is secured so as to be rotated when said shaft is turned to set the pointer at any workman's numeral upon the dial, as aforesaid. Upon the rear standard 7 a bar 37 is secured, having its upper edge beveled substantially as shown in Figs. 6 and 19, so that when the pointer is shifted to a point between two numerals a slight distance on one side of the center of the space between them, as shown in Fig. 1 between "10" and "11," and it is intended to have the pointer indicate "10," then when the shaft 5 is pulled out said pointer-guide (bar 37) will enter a space between two teeth on the gear 36, and the wedging actions of the guide will throw the pointer back to "10," thus aiding a workman in setting the pointer to the proper numeral upon the dial. In this class of time-recorders it frequently happens that the minute-wheel d, rotating continuously, will indicate a time between two minutes, so that unless prevented a record imprint would be made upon the disk which would not indicate either minute definitely—as, if the time was between fifty-eight and fifty-nine minutes past six, the imprint would be 6.85, giving only part of each minute numeral, instead of 6.58 or 6.59—and to remedy this defect I secure a minute-regulating disk 38 upon the time-shaft 22, provided with sixty perforations in one face adjacent to its outer periphery. In the frame of the printing mechanism a sleeve 39 is secured, provided with a spiral slot 40, and 41 is a bevel-point locking-bolt mounted and adapted to rotate and traverse said sleeve, by means of a pin 42, through said slot into said bolt, a rod 43 connected to said pin and a bar 44 connected to said rod, said bar engaging with a lever 45, which engages with the pointer-regulating gear 36, so that when said shaft 5 is pulled out said bolt is rotated and at the same time projected into engagement with one of the perforations in the disk 38, and the wedging action of its point turns the minute-wheel either forward or back, so that it will stand in proper position to print a minute-numeral and not parts of two such numerals. Though this may temporarily stop the minute-wheel, yet, through the flexibility of the flexible transmitting-shaft, the time of the clock-movement is not effected and a slight torsion is created upon said shaft, so that when the shaft 5 is retracted, as aforesaid, the spring 46 will retract said lock-bolt and release the disk 38, and then the torsion of the flexible shaft will restore said minute-wheel to its proper relation and time, the same as though it had not been stopped nor shifted. When the shaft 5 is pulled out and the lever 45 actuated by its engagement with the gear 36, as aforesaid, said lever, being pivoted at 47, Fig. 5, draws back the bar 48, provided with a lip 49, Fig. 6. Said lip engages with the arm 50, secured to the rock-shaft 51, and throws the impression-platen c away from the time-wheels, produces a tension upon the spring 52, secured to the rod 53, part of the frame of the printing mechanism, and as the swing of the platen-arm releases the arm 54 of the pivoted pawl, so the pawl-spring 55, secured to the pawl and engaging with the frame-rod 56, throws the pawl-arm 57 down to engage with the tooth 58 upon the bar 48, just as the platen-arm slips from engagement with said lip and the spring 52 impels the platen to strike an impression-blow. During this time the pawl has held the bar back against the tension of the spring 59, but as the platen strikes its blow, the lower end of the platen-arm strikes the arm 54 of the pawl, trips it, releases the bar 48, which flies forward, wedges through, under and re-engages with the platen-arm, the spring 60 supporting said bar and also permitting it to be depressed. The spring 59 can be made strong enough to return the shaft 5 and the other mechanisms actuated thereby to their respective normal positions.

In Fig. 12 the workmen's numerals are shown as arranged alternately in two lines and the pointer is shown as provided with an eye 61, through which a numeral is visible, and a point 62 beyond the eye, a very nice arrangement to be used with the double rows of numerals to aid in finding the proper numeral, permitting larger figures to be used.

In Figs. 13, 14 and 15 another style of pointer-guide is shown, consisting of a metallic ring 63, supported in front of the dial by means of angular brackets 64 and provided with the beveled notches 65, making it like unto a crown-gear, and so arranged that when the shaft 5 is pulled out, as aforesaid, the apex of the pointer will enter one of said notches and be guided into proper position and thus guide the record-disk the same as the devices shown in Fig. 19. This pointer-guide can be used singly or in conjunction with that shown in Fig. 19, or the latter can be used alone.

In Figs. 16, 17, and 18 an arrangement is shown whereby an employer can tell at a glance at the face of the dial what workmen are present, consisting of suitable supports 66, secured upon the dial, angular buttons 67, pivoted in said supports, and springs 68, engaging with the tilting buttons to hold them in either position, one arm of each button bearing a workman's numeral and the other, as in Fig. 16, projecting inward, so that the pointer will tilt it over, as shown in Figs. 17 or 18, whenever the shaft 5 is operated, and thus cover the numeral upon the dial and expose that upon the button. Then the employer or his agent can see what buttons are tilted and learn which employés are absent, they being indicated by the buttons which are not tilted. In this construction the buttons must be set prior to each entrance or departure of the workmen.

In Fig. 11 a mirror 69 is shown as mounted upon a bracket 70, secured upon the front standard 7 in such manner that any interested person can look through the opening 71 in the dial or front of the case and inspect the records made upon the record-disk, in order to learn both the time when the workmen or any one of them entered or departed, or who are the absentees. The hour-wheel is shifted hourly by the cam mechanism which is partly shown in Fig. 8 by the dotted lines, which is also shown and described in one or more of my prior inventions.

What I claim as my invention, and desire to secure by Letters Patent, is—

1. In a workman's time recorder, a stationary clock, in combination with a traversing frame, time-wheels mounted therein and connected to, actuated by and synchronous with said clock, and an impression mechanism whereby records are printed from said time-wheels onto a disk and in radial lines thereon and means to carry said disk independent of said frame and contiguous to said time-wheels.

2. In a workman's time recorder, a shaft carrying a workman's record-disk, a workman's numeral dial concentric therewith and means to rotate said shaft to set said disk according to any numeral upon said dial, in combination with a traversing frame, time-wheels carried thereby and synchronous with a stationary clock movement and an impression mechanism carried by said frame and means to operate it to print records from said time-wheels onto said disk at any point to which it is rotated.

3. In a workman's time recorder, a traversing frame, time-wheels mounted therein and a flexible shaft connecting them synchronously to a clock-movement, in combination with a shaft carrying a record disk provided with marginal numerals designating workmen, and means to imprint the numerals of said time-wheels upon said disk at the point to which it is manually rotated and in radial alignment with a marginal numeral for each workman.

4. In a workman's time recorder, the combination with a suitable frame, time-wheels journaled therein, a flexible shaft connecting them synchronously to a clock-movement, and an impression mechanism carried by said frame, and means to traverse said frame, adjacent to a suitably supported and rotatable disk, whereby the time-record of the entrances and departures of workmen are printed upon said disk in radial lines and concentric circular alignment.

5. In a workman's time-recorder, a dial provided with a series of workmen-designating numerals, a central shaft and pointer thereon carrying a record-disk provided with like designating numerals and concentric with said dial, in combination with a frame, time-wheels mounted therein and synchronously connected to a clock-movement, an impression mechanism and means to shift said frame and impression mechanism and set them to print time-records from said time wheels in a radial line upon said disk.

6. In a workman's time-recorder, a dial provided with workmen-designating numerals, a rotatable central shaft and pointer thereon carrying a record-disk provided with like designating numerals whereby the rotation of said shaft sets said disk to correspond with any given numeral upon said dial, in combination with a frame, time-wheels synchronously connected to a clock-movement, an impression mechanism carried by said frame and suitable to print the numerals of the time-wheels in circular alignment, and means to shift said frame, time-wheels and impression mechanism into proper position relative to said disk to imprint time-numeral records from said time-wheels, in concentric circular alignment upon said disk.

7. In a workman's time-recorder a traversing frame, time-wheels mounted therein synchronous with a clock-movement and flexibly connected thereto and an impression mechanism and means to shift them simultaneously to imprint the time indicated by said wheels in concentric circular alignment upon a record-disk, in combination with a manually rotated shaft carrying said record-disk.

8. In a workman's time-recorder a traversing frame, time-wheels mounted therein synchronous with a clock-movement and flexibly connected thereto, and an impression mechanism and means to shift them simultaneously to imprint the time indicated by said wheels in concentric circular alignment upon a suitable rotatable record-disk to record the entrances and departures of all of the workmen and in radial alignment thereon to record the individual record of each workman upon a single line.

9. In a workman's time recorder, a minute-wheel, a flexible shaft actuating it through a shaft —22— synchronously with a clock, in combination with a perforated disk upon said shaft —22—, a locking bolt, and means to intermittently actuate said bolt to engage with and set said minute wheel for the purposes set forth.

10. In a workman's time recorder, a workman's numeral-dial, in combination with a shaft central thereto, a pointer upon said shaft turned by the rotation thereof to any numeral upon said dial, a gear upon said shaft and a wedge with which it engages when said shaft is pulled out, whereby the pointer is locked accurately at any numeral.

11. In a workman's time recorder, a workman's numeral-dial, a shaft central thereto, and carrying and rotating a record-disk, a pointer thereon in combination with a gear upon said shaft and a wedge with which it engages when said shaft is pulled out, whereby said record-disk and pointer are accurately set and locked in unison with the numeral upon said dial to which the pointer is turned by the rotation of said shaft.

12. In a workman's time recorder, a workman's numeral-dial, a shaft central thereto, a pointer upon said shaft, and means to support a workman's time-record-disk provided with like workman's numerals, time wheels synchronous with a clock movement, and an impression mechanism, in combination with a gear upon said shaft and means to lock it and said record-disk when said shaft is pulled out at any numeral to which the pointer is turned.

13. In a workman's time recorder, a traversing frame, time-wheels mounted therein and synchronous with a clock-movement, a workman's designating dial, a shaft, a pointer thereon, a lever actuated by the longitudinal movement of said shaft, a bar actuated by said movement, a platen arm swung by the movement of said bar to bring an impression platen into position to print and means to impel said platen to make an impression upon a suitably mounted record-disk.

14. In a workman's time recorder, the combination with a dial, a shaft central thereto and a pointer thereon, of tilting buttons each bearing a workman's designating numeral with one of which said pointer engages when said shaft is pulled out, to tilt it and display the numeral.

15. In a workman's time recorder the combination with a workman's numeral dial and a workman's record-disk concentric therewith and having marginal numerals and adapted to be rotated so that any numeral of said disk will coincide with the like numeral of said dial of an impression mechanism mounted upon a traversing frame whereby records are printed upon said disk, in concentric circles, and in radial alignment with the marginal numerals thereon.

16. In a workman's time recorder, the combination with a suitable track-way and a frame mounted thereon, of a rack-bar upon said frame, a pinion engaging therewith, time wheels mounted in said frame, an impression mechanism also mounted therein and means to rotate said pinion and shift said frame upon said track-way to bring the time-wheels to a predetermined point, with reference to a record-disk suitably mounted to be rotated to a predetermined point.

In witness whereof I have hereunto set my hand on this 16th day of February, 1895.

WILLARD L. BUNDY.

In presence of—
JESSIE E. MURRAY,
HOWARD P. DENISON.